(12) United States Patent
Völcker et al.

(10) Patent No.: US 12,418,672 B2
(45) Date of Patent: Sep. 16, 2025

(54) TRANSMITTER, A RECEIVER AND METHODS. THEREIN FOR VALIDATION OF A VIDEO SEQUENCE

(71) Applicant: Axis AB, Lund (SE)

(72) Inventors: Björn Völcker, Lund (SE); Stefan Lundberg, Lund (SE)

(73) Assignee: AXIS AB, Lund (SE)

( * ) Notice: Subject to any disclaimer, the term of this patent is extended or adjusted under 35 U.S.C. 154(b) by 17 days.

(21) Appl. No.: 18/408,946

(22) Filed: Jan. 10, 2024

(65) Prior Publication Data
US 2024/0259580 A1    Aug. 1, 2024

(30) Foreign Application Priority Data
Jan. 30, 2023    (EP) .................................... 23153865

(51) Int. Cl.
| | | |
|---|---|---|
| H04N 19/46 | (2014.01) | |
| H04N 19/103 | (2014.01) | |
| H04N 19/136 | (2014.01) | |
| H04N 19/167 | (2014.01) | |
| H04N 19/172 | (2014.01) | |

(52) U.S. Cl.
CPC .......... *H04N 19/46* (2014.11); *H04N 19/103* (2014.11); *H04N 19/136* (2014.11); *H04N 19/167* (2014.11); *H04N 19/172* (2014.11)

(58) Field of Classification Search
CPC ..................................................... H04N 19/46
See application file for complete search history.

(56) References Cited

U.S. PATENT DOCUMENTS

| | | |
|---|---|---|
| 7,120,252 B1 | 10/2006 | Jones et al. |
| 2004/0003261 A1 | 1/2004 | Hayashi |
| 2011/0150269 A1 | 6/2011 | Yoshioka |
| 2016/0204942 A1* | 7/2016 | Bohli .................... H04L 9/3236 713/168 |

FOREIGN PATENT DOCUMENTS

EP        2107711 B1      11/2010

OTHER PUBLICATIONS

Lu, J., "Video fingerprinting for copy identification: from research to industry applications," Media Forensics and Security, (2009).
Extended European Search Report issued on Jul. 6, 2023 for European Patent Application No. 23153865.3.

* cited by examiner

*Primary Examiner* — Jerry T Jean Baptiste
(74) *Attorney, Agent, or Firm* — Volpe Koenig

(57) ABSTRACT

A transmitter and a method therein for enabling validation of a video sequence comprising encoded image frames by providing the sequence with a data structure and a digital signature. The method comprises: performing lossless compression of each encoded image frame to obtain a respective losslessly compressed (LC) encoded image frame; identifying small frames each having a data size that is smaller than a predefined number of bytes as small LC encoded image frames; generating a data structure comprising: the small LC encoded image frames; and individual hashes of either all encoded image frames lacking a respective small frame or all other obtained LC encoded image frames being different from the small frames; generating a digital signature; and providing the data structure and the digital signature to the video sequence.

15 Claims, 7 Drawing Sheets

S602. Receive a video sequence 200' comprising encoded image frames 220' and being provided with a data structure 320 and a digital signature 340

S604. Verify the received digital signature 340 using the received data structure 320

S606. Verify the received encoded image frames 220' using the received data structure 320

Fig. 6

S606.1.1. Generate individual hashes of each received encoded image frame 220'

S606.1.2. Perform lossless decompression of each small LC encoded image frame 220LCb-1, 220LCb-2 comprised in the received data structure 320 to obtain a respective encoded image frame S606.1.3. Generate individual hashes of each obtained respective encoded image frame S606.1.4. Verify the received encoded image frames 220' as being equal to the transmitted encoded image frames 220 when the generated individual hashes of each received encoded image frame 220' match the generated individual hashes of each obtained respective encoded image frame

Fig. 7A

S606.2.1. Perform lossless compression of each received encoded image frame 220' to obtain respective LC received encoded image frames 220LCa', 220LCb-1', 220LCb-2'

S606.2.2. Generate individual hashes of all obtained respective LC received encoded image frames 220LCa', 220LCb-1', 220LCb-2'

S606.2.3. Generate individual hashes for all the LC encoded image frames 220LCa, 220LCb-1, 220LCb-2 as given by the received data structure S606.2.4. Verify the received encoded image frames 220' as being equal to the transmitted encoded image frames 220 when the generated individual hashes for all the LC encoded image frames 220LCa, 220LCb-1, 220LCb-2 as given by the received data structure 320 match the generated individual hashes of all obtain respective LC received encoded image frames 220LCa', 220LCb-1', 220LCb-2'

Fig. 7B

S606.3.1. Perform lossless compression of each received encoded image frame 220' to obtain respective LC received encoded image frames 220LCa', 220LCb-1', 220LCb-2'

S606.3.2. Generate a data structure 320' comprising small LC received encoded image frames 220LCb-1', 220LCb-2', and individual hashes of all other LC received encoded image frames 220LCa' being different from the small LC encoded image frames 220LCb-1', 220LCb-2'

S606.3.3. Verify the received encoded image frames 220' as being equal to the transmitted encoded image frames 220 when the generated data structure 320' matches the received data structure 320

Fig. 7C

TRANSMITTER, A RECEIVER AND METHODS. THEREIN FOR VALIDATION OF A VIDEO SEQUENCE

TECHNICAL FIELD

The present invention relates to a transmitter, and a method therein, for enabling validation of a video sequence. Also, the present invention relates to a receiver, and a method therein, for validating the video sequence. Especially, the validation is enabled by providing the video sequence with a data structure and a digital signature.

BACKGROUND

A digital signature provides a layer of validation and security to a digital message, such as a video sequence comprising encoded image frames, that is transmitted through a non-secure channel from a transmitter to a receiver. The transmitter may generate the digital signature by encrypting, using a private encryption key of a private-public encryption key pair, one or more cryptographic hash values of the video sequence. The cryptographic hash values may be frame-wise cryptographic hash values, wherein each cryptographic hash value may be a hash value of a respective encoded image frame's image data, or a hash value of that encoded image frame's image data in combination with optional further information. Usually both the generated digital signature and the frame-wise cryptographic hash values used to generate the digital signature are provided to the video sequence by the transmitter before transmitting the video sequence to the receiver.

To validate that a received video sequence is an authentic video sequence from an alleged transmitter and that the received video sequence has not been manipulated, a receiver needs to verify both the digital signature and the received encoded image frames.

To verify a received digital signature, the receiver of the video sequence decrypts the received digital signature using a public key of the transmitter's private-public encryption key pair and compares the decrypted received digital signature with the received one or more cryptographic hash values. If the decrypted received digital signature is equal to, e.g., matches, the received cryptographic hash values, the received digital signature is verified. Thereby, it is verified that the video sequence received by the receiver was digitally signed by the alleged transmitter.

In addition to the verification of the digital signature, the receiver needs to verify that the video sequence received is the same as the video sequence transmitted by the transmitter. One way of verifying a sequence of received encoded image frames is for the receiver to generate cryptographic hash values of the encoded image frames in the received video sequence in the same way as the transmitter generated the cryptographic hash values. Thus, there is an agreement between the transmitter and the receiver on how to generate cryptographic hash values. Once the receiver has generated the cryptographic hash values, the receiver compares its generated cryptographic hash values with the received cryptographic hash values, and if they are the same, e.g., match each other, the received video sequence has been verified as the same as the transmitted video sequence.

However, by adding the digital signature and especially, by adding the cryptographic hash values to the video sequence, the bitrate required for transmitting the video sequence increases. As available bitrate may be a limiting factor when transmitting video sequences over the communication channel there is a need to reduce the bitrate required for transmitting the digital signature and the cryptographic hash values without sacrificing or deteriorating the ability for a receiver to validate the video sequence.

SUMMARY OF THE INVENTION

In view of the above, it is thus an objective of the present invention to mitigate drawbacks with the prior art and to enable validation of a video sequence with a reduction in the required bitrate for transmitting the video sequence and additional data needed for the validation as compared to the prior art. A further objective is to reduce the size of the additional data thereby decreasing the required bitrate for transmission. A yet further objective is to provide the video sequence with the additional data as a data structure and a digital signature which data structure and a digital signature enable the video sequence to be validated and at the same time require reduced amount of available bitrate resources for transmission. A still further objective is to propose a transmitter and computer program with these capabilities. A further objective is to perform validation of the video sequence provided with the data structure and the digital signature. A yet further objective is to propose a receiver and computer program with these capabilities.

At least some of these objectives are achieved by the invention as defined by the independent claims. The dependent claims relate to advantageous embodiments.

According to a first aspect of this disclosure, there is provided a method performed by a transmitter for enabling validation of a video sequence by providing the video sequence with a data structure and a digital signature, wherein the video sequence comprises encoded image frames.

The method comprises performing lossless compression of each encoded image frame of the video sequence to obtain a respective losslessly compressed (LC) encoded image frame.

Further, the method comprises, among the obtained LC encoded image frames, identifying one or more small LC encoded image frames each having a data size that is smaller than a predefined number of bytes.

Furthermore, the method comprises generating a data structure comprising the identified one or more small LC encoded image frames, and individual hashes of either: all encoded image frames lacking a respective small LC encoded image frame; or all other obtained LC encoded image frames being different from the one or more small LC encoded image frames. The individual hashes are obtained by individually hashing each one of the all encoded image frames lacking a respective small LC encoded image frame, or by individually hashing each one of the all other obtained LC encoded image frame, respectively.

Yet further the method comprises generating a digital signature for the video sequence; and providing the data structure and the digital signature to the video sequence. Thereby enabling a receiver to validate the video sequence.

By performing lossless compression and by including the identified small LC encoded image frames in the data structure instead of respective hashes, the size of the data structure can be reduced without compromising with the data structure's usefulness when validating the video sequence.

In this disclosure the term "data structure" should be understood as any structure, element, or unit configured to be provided to the video sequence and configured to comprise information as a text sequence of text, as a binary sequence, i.e., a bitstream, as a sequence of bytes, i.e., a byte stream, or as a combination thereof, just to give some examples. The data structure is sometimes referred to as a document. The data structure is configured to comprise one or more small LC encoded image frames and one or more individual hashes. The data structure may also comprise metadata, i.e., data that may relate to information comprised in the data structure. Thus, the metadata may relate to the one or more small LC encoded image frames and/or to the one or more individual hashes. As will be described below, sometimes the data structure comprises information about the location and optionally also the size of one or more small LC encoded image frames. Hence, the location and the size are two examples of metadata that can be comprised in the data structure. Another example of metadata is the type of the small LC encoded image frame. As will be described below, the small LC encoded image frame may be of a first type or of a second type, and consequently this information may be comprised in the data structure as metadata.

By the expression "all encoded image frames lacking a respective small LC encoded image frame" when used herein should be as understood as all encoded image frames for which the obtained respective LC encoded image frame is not identified as a respective small LC encoded image frame. In other words, all those encoded image frames lacking a respective small LC encoded image frame has a respective LC encoded image frame that is not a small LC encoded image frame. Thus, the data size of the respective LC encoded image frame of all encoded image frames lacking a respective small LC encoded image frame is not smaller than the predefined number of bytes, but instead the data size is equal to or larger than the predefined number of bytes.

By the expression "all other LC encoded image frames being different from the small LC encoded image frames" when used herein should be understood as those obtained LC encoded image frames not being identified as small LC encoded image frames. Thus, all other LC encoded image frames being different from the small LC encoded image frames each has a data size that is not smaller than the predetermined number of bytes but instead a data size that is equal to or larger than the predetermined number of bytes.

As used herein "a digital signature" is meant a digital code which is provided to the transmitted video sequence to verify the transmitter's identity. The digital code is generated and authenticated by private/public key encryption. In more detail, the transmitter generates the digital code using a private key of an encryption key pair of the transmitter and a receiver authenticates the digital code using a public key of the transmitter's encryption key pair.

By the expression "performing lossless compression of each encoded image frame" when used herein is meant compressing each encoded image frame, without loss of image information, into a compressed encoded image frame. The compressed encoded image frame may have a data size that is equal to or smaller than the encoded image frame. Sometimes, the compressed encoded image frame has a data size that is larger than the encoded image frame, in such case the encoded image frame may be used as the compressed encoded image frame. In other cases, the lossless compression may result in a compressed encoded image frame comprising a reference to another encoded image frame. The another encoded image frame may be a previous encoded image frame in the video sequence or a stored encoded image frame. Importantly, no image information is lost when performing the lossless compression. As no image information is lost in the lossless compression, the original encoded image frame can be perfectly reconstructed from the compressed encoded image with no loss in image quality. The action of reconstructing the original encoded image frame from the compressed encoded image frame may be referred to as decompressing the compressed encoded image frame into the originally encoded image frame. The compressed encoded image frame is in this disclosure referred to as a losslessly compressed (LC) encoded image frame.

Some examples of lossless compression algorithms are Huffman coding, arithmetic encoding, codebook-based encoding and run-length encoding. A device performing the lossless compression as described above is herein referred to as a lossless compressing module configured to perform lossless compression of encoded image frames.

In this disclosure "a losslessly compressed (LC) encoded image frame" is meant an image frame resulting from lossless compression of an encoded image frame.

By the expression "individually hashing an encoded image frame" is meant applying a hash function (or one-way function) to each individual encoded image frame to obtain an individual hash. The hash function may be a cryptographic hash function that provides a safety level considered adequate in view of the sensitivity of the video sequence to be signed and/or in view of the value at stake if the video sequence is manipulated by an unauthorized party. Three examples of hash functions are Secure Hash Algorithm 256-bit (SHA-256), Secure Hash Algorithm3 512-bit (SHA3-512) and Rivest-Shamir-Adleman 1024-bit (RSA-1024). The hash function shall be predefined (e.g., it shall be reproducible) so that the individual hashes can be regenerated when the digital signature and/or data structure is to be verified by the receiver.

As used herein "an individual hash" is meant an individual cryptographic hash value obtained by applying a hash function to an individual encoded image frame or an individual LC encoded image frame.

According to a second aspect of this disclosure, there is provided a method performed by a receiver for validating a video sequence provided with a data structure and a digital signature, wherein the video sequence comprises encoded image frames.

The method comprises receiving, from a transmitter, the video sequence comprising encoded image frames and being provided with the data structure and the digital signature.

The received data structure comprises:
  one or more small losslessly compressed (LC) encoded image frames, wherein each small LC encoded image frame has a data size that is smaller than a predefined number of bytes and is an LC version of a respective transmitted encoded image frame comprised in a video sequence transmitted from the transmitter; and
  individual hashes of either: all transmitted encoded image frames lacking a respective small LC encoded image frame; or all other LC encoded image frames being different from the one or more small LC encoded image frames. Each one of the all other LC encoded image frames is an LC version of a respective transmitted encoded image frame comprised in the transmitted video sequence.

Further, the method comprises verifying the received digital signature using the received data structure; and verifying the received encoded image frames as being equal to the transmitted encoded image frames using the received data structure. Whereby the received video sequence is validated as being equal to the transmitted video sequence when the received digital signature and the received encoded image frames are verified.

According to a third aspect of this disclosure, there is provided a transmitter for enabling validation of a video sequence by providing the video sequence with a data structure and a digital signature, wherein the transmitter comprises processing circuitry configured to cause the transmitter to perform any of the actions of the method of the first aspect.

According to a fourth aspect of this disclosure, there is provided a receiver for validating a video sequence provided with a data structure and a digital signature, wherein the receiver comprises processing circuitry configured to cause the receiver to perform any of the actions of the method of the second aspect.

According to a fifth aspect of this disclosure, there is provided a non-transitory computer-readable medium having stored thereon computer code instructions adapted to carry out the method of the first aspect when executed by a device having processing capability.

According to a sixth aspect of this disclosure, there is provided a non-transitory computer-readable medium having stored thereon computer code instructions adapted to carry out the method of the second aspect when executed by a device having processing capability.

The second, third, fourth, fifth, and sixth aspects may generally have the same features and advantages as the first aspect.

The present disclosure further relates to a computer program containing instructions for causing a computer to carry out any one of the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. It is further noted that the invention relates to all possible combinations of features disclosed herein unless explicitly stated otherwise.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein:

FIG. 6 is a flowchart of a method performed by a receiver for validating a video sequence according to embodiments.

FIGS. 7A-7C are flowcharts of sub-methods performed by the receiver for verifying received encoded image frames according to embodiments.

DETAILED DESCRIPTION OF EMBODIMENTS

The aspects of the present disclosure will now be described more fully hereinafter with reference to the accompanying drawings, on which certain embodiments of the invention are shown. These aspects may however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

To overcome or mitigate constrains in bitrate availability when transmitting a video sequence over a communications network and especially when transmitting the video sequence with additional data enabling validation of the video sequence, the present invention relates to the reduction in size of the additional data while not deteriorating the reliability of the validation. In this disclosure, the additional data is a data structure and a digital signature. Especially, the present invention relates to the reduction in size of the data structure by reducing the size of the data structure's content while keeping the validation reliable.

Before going into details on how to enable validation of the video sequence provided with the data structure and the digital signature, and on how to validate the video sequence, the components of a system wherein the present invention can be realised will be described.

Figure 1:
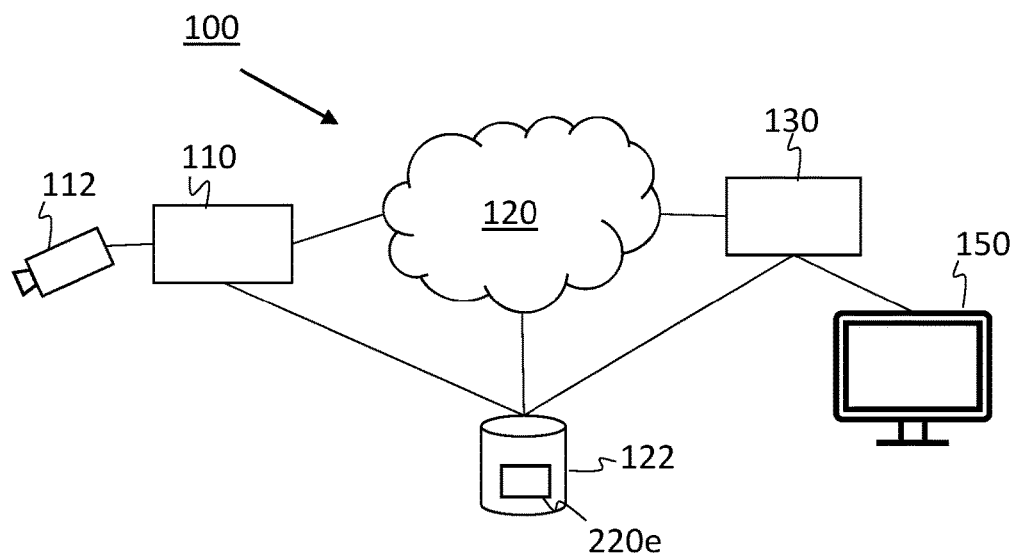
FIG. 1 schematically illustrates embodiments of a system for enabling validation of a video sequence and for validating the video sequence.

With reference to FIG. 1, embodiments of a system 100 for enabling validation of a video sequence and for validating the video sequence will be described. The system 100 comprises a transmitter 110 configured to enable validation of the video sequence. The transmitter 110 may comprise or may be connected to one or more cameras 112. Alternatively, the transmitter 110 may be comprised in a camera 112. The transmitter 110 and the one or more cameras 112 may be referred to as a camera system. The camera system may be comprised in one single unit, i.e., one unit comprising the transmitter 110 and one or more cameras 112, or in several separate units. The camera 112 may be a monitoring camera, sometimes also referred to as surveillance camera. Further, the camera 112 may be a fixed camera such as a stationary camera, or a movable camera such as a pan, tilt and zoom (PTZ) camera. The camera 112 may be a visible light camera, a thermal camera, or a camera comprising both a visible light camera and a thermal camera. It should be noted that the camera 112 may include several components relating to e.g., image capturing such as a capturing module, and image processing such as an encoding module, which are common in conventional camera systems and whose purpose and operations are well known to those having ordinary skill in the art. Such components have been omitted from the illustration and description of FIG. 1 for clarity reasons.

As further illustrated in FIG. 1, the transmitter 110 is configured to communicate over a communications network 120 with a receiver 130. The communications network 120 may be a wired or wireless communications network over which the transmitter 110 transmits video sequences to the receiver 130. The receiver 130 may comprise or may be connected to a display device 150 configured to display, to an operator, video sequences received by the receiver 130. The transmitter 110 and the receiver 130 are configured to communicate with a data storage 122 either directly or via the communications network 120. The data storage 122 may be configured to store data relating to video sequences such as data relating to encoded image frames and/or to LC encoded image frames. For example, the data storage 122 may comprise pre-defined encoded image frames 220e. The pre-defined encoded image frames 220e may be stored in the data storage 122 as a lookup table wherein each stored pre-defined encoded image frame 220e is identified by an identifier, sometimes referred to as an index or a key. In some embodiments the lookup table is a code book, and the index/key is a codeword. The data storage 122 may be a non-volatile memory. Further, the data storage may comprise a common library.

It should be understood that there are many combinations of wireless and wired transmission models that can be used for transmissions between the transmitter 110 and the communications network 120, between the communications network 120 and the receiver 130, and between the data storage 122, the transmitter 110, the communications network 120, and the receiver 130, and that FIG. 1 only illustrates one example.

Figure 2A:
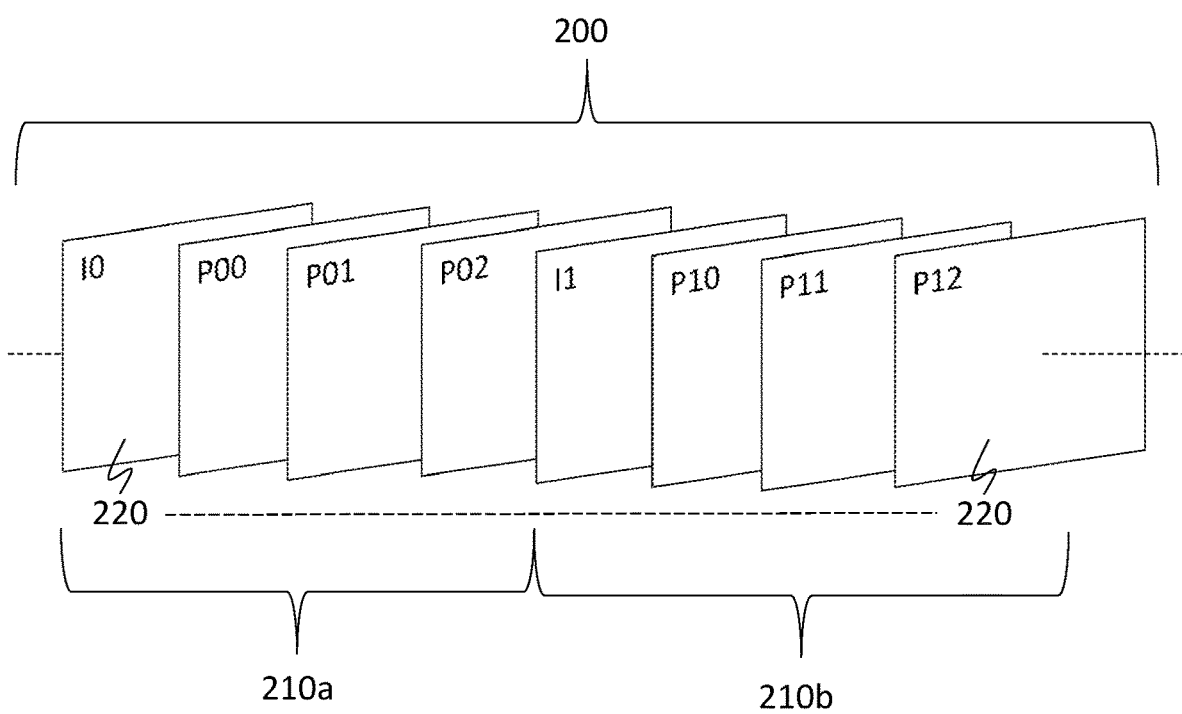
FIG. 2A schematically illustrates a video sequence according to embodiments.

FIG. 2A schematically illustrates an exemplifying video sequence 200 according to embodiments. The video sequence 200 comprises a number of encoded image frames 220. An encoded image frame used as a reference for prediction-coding other frames is called a reference frame. Frames encoded without information from other frames are referred to as intra-coded frames, intra-frames, I-frames or key frames. Frames that use prediction from one or more reference frames are referred to as inter-coded frames or inter-frames. A P-frame is an inter-frame that uses prediction from one or more preceding reference frames (or one or more frames for prediction of each region) and a B-frame is an inter-frame that uses prediction from a (possibly weighted) average of two reference frames, one or more preceding frames and/or one or more succeeding frames. A frame is sometimes referred to as a picture.

The encoded image frames 220 may be arranged in one or more groups of pictures (GOPs). In FIG. 2A, the encoded image frames 220 are arranged in a plurality of GOPs out of which a first GOP 210a and a second GOP 210b are illustrated. As schematically illustrated in the exemplifying video sequence 200, the first GOP 210a consists of a first I-frame I0, a first P-frame P00, a second P-frame P01, and a third P-frame P02; and the second GOP 210b consists of a first I-frame I1, a first P-frame P10, a second P-frame P11, and a third P-frame P12.

There are a number of conventional video encoding protocols. Some common video encoding protocols that work with the various embodiments of the present invention include: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-1 Part 3 and Future Video Coding (FVC); VP9, VP10 and AOMedia Video 1 (AV1), just to give some examples.

Figure 2B:
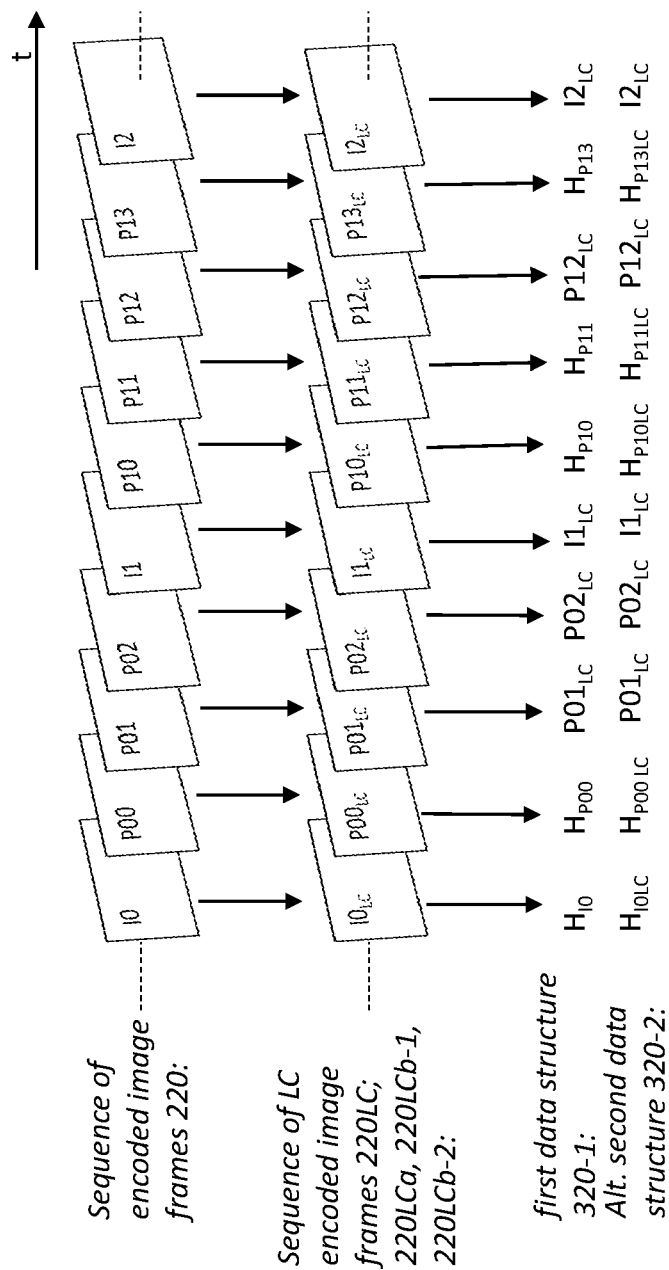
FIG. 2B schematically exemplifies a sequence of encoded image frames, a sequence of corresponding LC encoded image frames and two examples of the data structure content according to embodiments.
Figure 3:
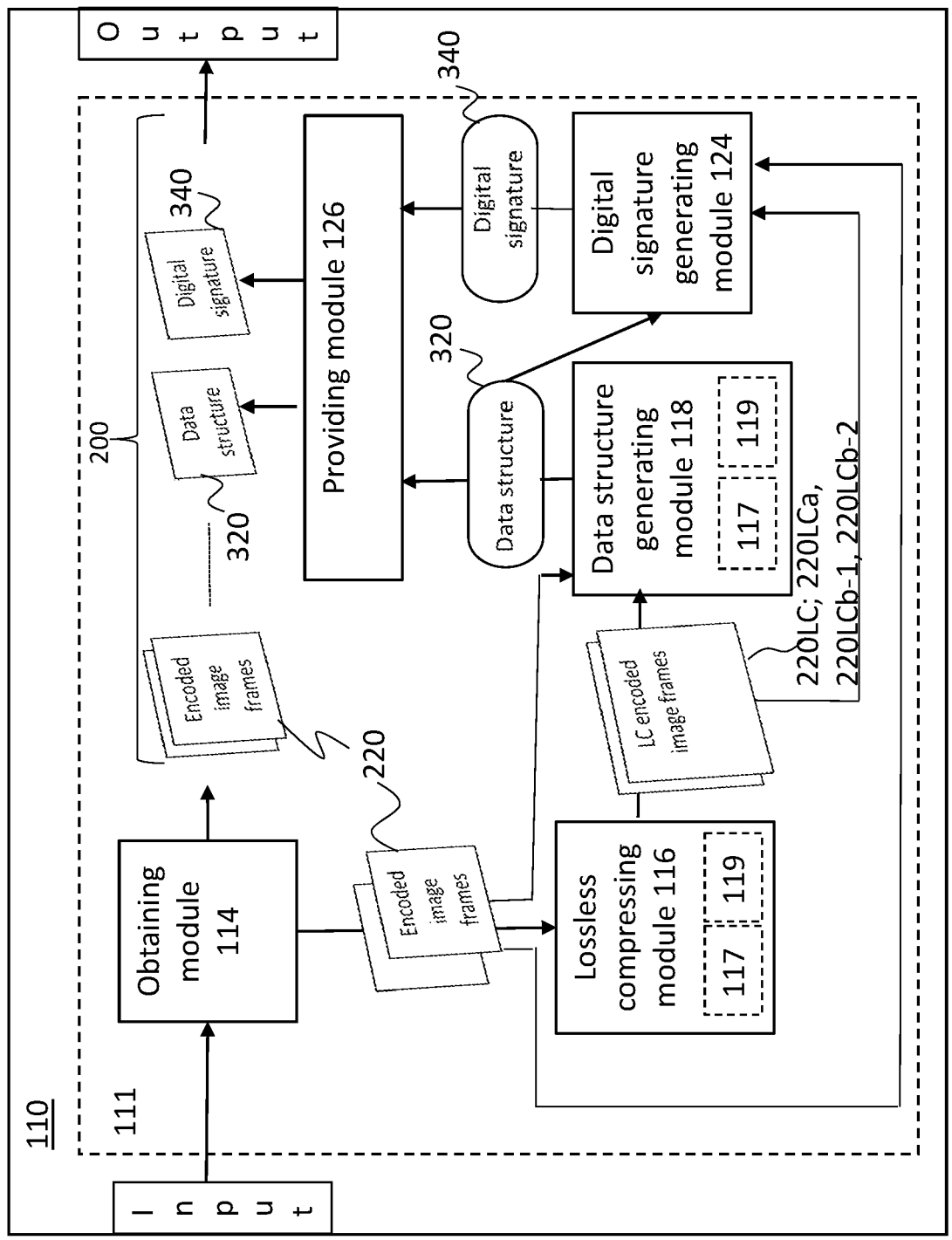
FIG. 3 schematically illustrates a transmitter according to embodiments.
Figure 5:
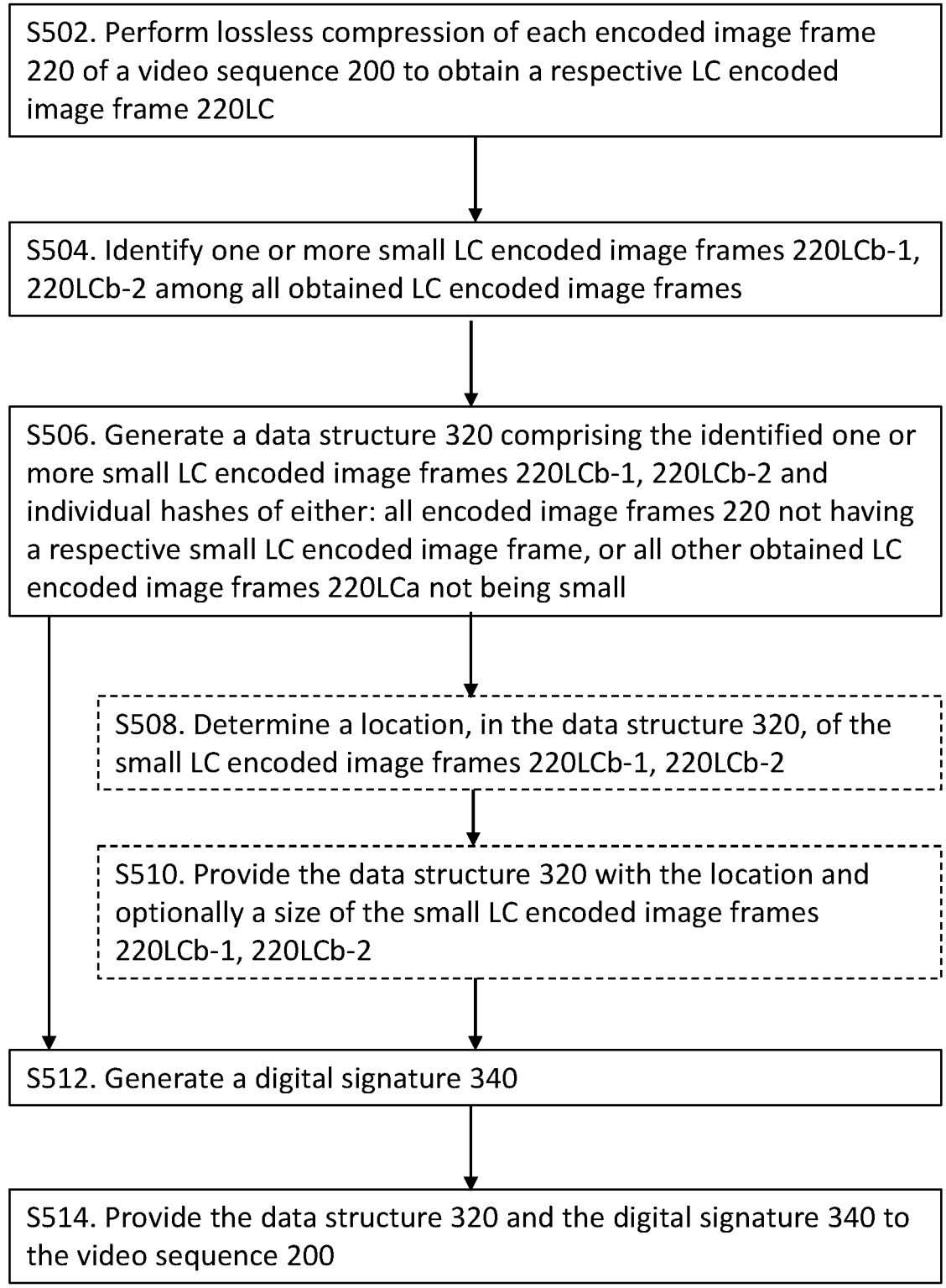
FIG. 5 is a flowchart of a method performed by a transmitter for enabling validation of a video sequence according to embodiments.

A method performed by the transmitter 110 for enabling validation of a video sequence 200 by providing the video sequence 200 with a data structure 320 and a digital signature 340, will now be described with reference to the flowchart of FIG. 5 and with reference to FIG. 3 schematically illustrating the transmitter 110 according to embodiments. Reference will also be made to FIG. 2B schematically exemplifying a sequence of encoded image frames, a sequence of corresponding LC encoded image frames and two examples of the data structure content according to embodiments.

As previously mentioned, the video sequence 200 comprises encoded image frames 220, and the video sequence 200 may be composed of at least one group of pictures (GOPs) 210a, 210b. As illustrated in FIG. 2B, the sequence of encoded image frames may comprise the encoded image frames I0, P00, P01, P02, I1, P10, P11, P12, P13, and I2, wherein the encoded image frames I0, P00, P01, and P02 may be comprised in one GOP, the encoded image frames I1, P10, P11, P12, and P13 may be comprised in another GOP, and the encoded image frame I2 may be comprised in yet another GOP.

The encoded image frames 220 of the video sequence 200 may have been obtained from the camera 112 that captured a number of image frames depicting a scene and that encoded the captured image frames into the encoded image frames 220. The camera 112 may provide an obtaining module 114 of the transmitter 110 with the encoded image frames 220. In cases wherein the camera 112 is comprised in the transmitter 110 (then referred to as the camera system 110), the camera 112 realizes the obtaining module of the transmitter 110. In other cases, wherein the camera 112 is external of and connected to the transmitter 110, the obtaining module 114 of the transmitter 110 could be realised by an internal data storage configured to receive encoded image frames 220 from the camera 112 and to store the received encoded image frames 220 in the internal data storage.

In step S502, the transmitter 110 performs lossless compression of each encoded image frame 220 of the video sequence 200 to obtain a respective LC encoded image frame 220LC. This is done to obtain a respective LC encoded image frame having a size that is equal to or less than the size of the encoded image frame 220 on which the lossless compression was performed while at the same time obtain the respective LC encoded image frame with the same image quality as the encoded image frame 220 on which the lossless compression was performed. As illustrated in FIG. 2B, the sequence of LC encoded image frames comprises the LC encoded image frames $I0_{LC}$, $P00_{LC}$, $P01_{LC}$, $P02_{LC}$, $I1_{LC}$, $P10_{LC}$, $P11_{LC}$, $P12_{LC}$, $P13_{LC}$, and $I2_{LC}$. As also illustrated in FIG. 2B by the arrows from one encoded image frame of the sequence of encoded image frames to one LC encoded image frame of the sequence of LC encoded image frames, the lossless compression of an encoded image frame results in a respective LC encoded image frame. For example, lossless compression of the encoded image frame I0 results in the LC encoded image frame $I0_{LC}$, lossless compression of the encoded image frame P00 results in the LC encoded image frame $P00_{LC}$, lossless compression of the encoded image frame P01 results in the LC encoded image frame $P01_{LC}$, etc. Thus, as shown in FIG. 2B each encoded image frame has a respective lossless LC encoded image frame.

The lossless compression may be performed based on one or more out of Huffman coding, arithmetic encoding, codebook-based encoding and run-length encoding, just to give some examples. Step S502 may be performed by a lossless compressing module 116 comprised in the transmitter 110 and being configured to perform lossless compression of encoded image frames.

As mentioned above an aim of the lossless compression is to obtain a respective LC encoded image frame 220LC that has a data size that is equal to or less than the data size of its respective encoded image frame 220. However, lossless compression will not always result in that the respective LC encoded image frame 220LC has an equal or reduced data size as compared to the data size of its respective encoded image frame 220. Therefore, the lossless compressing module 116 compares the size of the respective LC encoded image frame 220LC with the size of its respective encoded image frame 220, and if the respective LC encoded image frame 220LC has a larger size, the lossless compressing module 116 will output its respective encoded image frame 220 as the LC encoded image frame. An alternative way of reducing the size of the LC encoded image frame is to create the LC encoded image frame such that it lacks image information but comprises a reference to, and possibly a difference vis-à-vis, another encoded image frame, such as a stored predefined encoded image frame 220e. This may be the case when the transmitter 110 determines that the encoded image frame on which the lossless compression is performed is a skip frame.

By "a skip frame" is meant a type of an inter frame that represent image data by only referring (e.g., by only including references) to image data in other frames without any residual values. When decoding a skip frame, a decoder uses the referenced image data as a representation of the image data represented by the skip frame without making any adjustments (as residual values are lacking).

In step S504, the transmitter 110 identifies, among the obtained LC encoded image frames 220LC, one or more small LC encoded image frames 220LCb-1, 220LCb-2 each having a data size that is smaller than a predefined number of bytes. The predefined number of bytes may be set in dependence on the hash function used. For example, the predefined number of bytes may be 64 bytes (512 bits), 48 bytes (384 bits) or 32 bytes (256 bits) for SHA-2 hashes, and 20 bytes (160 bits) for SHA-1 hashes. An identifying module 117 comprised in the transmitter 110 and being configured to identify the one or more small LC encoded image frames may perform step S504. The identifying module 117 may be comprised in the lossless compressing module 116. Alternatively, the identifying module 117 may be comprised in a data structure generating module 118 of the transmitter 110. The data structure generating module 118 will be described below.

One or more identified small LC encoded image frames 220LCb-1, 220LCb-2 may be of a first type of small LC encoded image frames 220LCb-1 wherein each is either equal to the (original) encoded image frame 220 having a data size that is smaller than the predefined number of bytes and on which the lossless compression was performed, or equal to the LC encoded image frame 220LC of the (original) encoded image frame 220 when the LC encoded image frame 220LC is smaller than the (original) encoded image frame 220 and has a data size that is smaller than the predefined number of bytes.

The former may for example be the case when the lossless compression of the encoded image frame 220, having a data size that is smaller than the predefined number of bytes, resulted in the same encoded image frame 220 or when the lossless compression of the encoded image frame 220 would result in an LC encoded image frame 220LC being larger than the encoded image frame 220. As mentioned above, in this case the lossless compressing module 116 performing the lossless compression outputs the original encoded image frame 220 as the LC encoded image frame 220LCb-1.

Thus, in some embodiments, at least one of the identified one or more small LC encoded image frames 220LCb-1, 220LCb-2 is a small LC encoded image frame 220LCb-1 of a first type and is equal to its respective encoded image frame 220 or equal to the LC encoded image frame 220LC of the encoded image frame 220.

Alternatively, or additionally, one or more identified small LC encoded image frames 220LCb-1, 220LCb-2 may be of a second type of small LC encoded image frame 220LCb-2 wherein each is equal to a part of a stored encoded image frame 220e and comprises an identifier of the stored encoded image frame 220e and possibly also a difference.

This may be the case when the encoded image frame 220 on which the lossless compression was performed is identical with the stored encoded image frame 220e or is partly identical with the stored encoded image frame 220e. In case the encoded image frame is a skip frame, there is no difference between the stored encoded image frame 220e and the encoded image frame 220, and consequently the small LC encoded image frame 220LCb-2 of the second type only comprises the identifier of the stored encoded image frame 220e and no difference.

However, the encoded image 220 frame may be partly identical with the stored encoded image frame 220e and then the small LC encoded image frame 220LCb-2 of the second type may comprise the identifier of the stored encoded image frame 220e and the difference. The difference may relate to a part of an otherwise constant image frame that is updated or changed at certain time points. For example, the difference may relate to a counter, or a clock comprised in the encoded image frame 220, and the difference is the only that make the encoded image frame 220 different from the stored encoded image frame 220e. In such case, the difference comprised in the small LC encoded image frame 220LCb-2 of the second type relates to the counter value or the time of the clock.

Therefore, in some embodiments, at least one of the identified one or more small LC encoded image frames 220LCb-1, 220LCb-2 is a small LC encoded image frame 220LCb-2 of a second type and comprises an identifier of a stored predefined encoded image frame 220e and a possible difference between the small LC encoded image frame 220LCb-2 of the second type and the stored predefined encoded image frame 220e.

In order to enable validation of the video sequence, a data structure 320 is needed. Therefore, in step S506, the transmitter 110 generates a data structure 320 that comprises the identified one or more small LC encoded image frames 220LCb-1, 220LCb-2 and individual hashes. The individual hashes comprised in the data structure 320 may be generated in two ways. Firstly, the individually hashes may be individual hashes of all encoded image frames 220 lacking a respective small LC encoded image frame 220LCb-1, 220LCb-2 as shown in a first data structure 320-1 of FIG. 2B. Secondly, the individual hashes may be individual hashes of all other obtained LC encoded image frames 220LCa being different from the one or more small LC encoded image frames 220LCb-1, 220LCb-2 as shown in an alternative second data structure 320-2 of FIG. 2B. Thus, the individual hashes are individual hashes of either all encoded image frames 220 lacking a respective small LC encoded image frame 220LCb-1, 220LCb-2, or all other obtained LC encoded image frames 220LCa being different from the one or more small LC encoded image frames 220LCb-1, 220LCb-2. The transmitter 110 obtains the individual hashes by individually hashing each one of the all encoded image frames 220 lacking a respective small LC encoded image frame 220LCb-1, 220LCb-2, or by individually hashing each one of the all other obtained LC encoded image frame 220LCa, respectively. The data structure is, as will be described below, to be used by the receiver 130 when validating the video sequence. The transmitter 110 comprises a data structure generating module 118 configured to generate the data structure and the data structure generating module 118 may perform step S506.

In the example illustrated in FIG. 2B, the LC encoded image frames $P01_{LC}$, $P02_{LC}$, $I1_{LC}$, $P12_{LC}$, and $I2_{LC}$ are identified as being small LC encoded image frames 220LCb-1, 220LCb-2, and therefore, both the first data structure 320-1 and the alternative second data structure 320-2 illustrated comprise theses small LC encoded image frames $P01_{LC}$, $P02_{LC}$, $I1_{LC}$, $P12_{LC}$, and $I2_{LC}$.

In addition to the small LC encoded image frames, the first data structure 320-1 comprises individual hashes of all encoded image frames 220 lacking a respective small LC encoded image frame 220LCb-1, 220LCb-2. Thus, in the illustrated example, the (first) data structure also comprises the individual hashes $H_{I0}$, $H_{P00}$, $H_{P10}$, and $H_{P13}$.

The alternative second data structure 320-2 comprises, in addition to the small LC encoded image frames, individual hashes of the all other obtained LC encoded image frames 220LCa being different from the identified small LC encoded image frames 220LCb-1, 220LCb-2. Thus, the alternative (second) data structure also comprises individual hashes $H_{I0LC}$, $H_{P00LC}$, $H_{P10LC}$, and $H_{P13LC}$ which are the individual hashes of the LC encoded image frames $I0_{LC}$, $P00_{LC}$, $P10_{LC}$, and $P13_{LC}$.

The data structure 320 may be referred to as a document comprising a reduced hash list. The hash list is reduced since it does not only comprise hashes for all the encoded image frames as a complete hash list does, but the reduced hash list comprises instead of the hashes of the small LC encoded image frames, the small LC encoded image frames as they are, i.e. unhashed. This is in contrast to cases wherein the data structure is a document comprising the complete hash list consisting of a respective individual hash for each encoded image frame of the video sequence. Specifically, the present data structure 320 comprises the LC encoded image frame for each LC encoded image frame being identified as small and the individual hashes of either all encoded image frames 220 lacking a respective small LC encoded image frames or all LC encoded image frame having a size being equal to or larger than the predefined number of bytes. Thus, the reduced hash list only consists of the identified one or more small LC encoded image frames 220LCb-1, 220LCb-2; and the individual hashes of either all encoded image frames 220 lacking a respective small LC encoded image frames 220LCb-1, 220LCb-2, or all other obtained LC encoded image frames 220LCa being different from the one or more small LC encoded image frames 220LCb-1, 220LCb-2.

In embodiments, wherein the video sequence is composed of GOPs, the transmitter 110 generates one data structure 320 and one digital signature 340 per one or more GOPs 210a, 210b. Thereby, the transmitted video sequence can be validated by the receiver 130 per GOP instead of per the entire video sequence. This is advantageous for the receiver 130 since if one or more encoded image frames or GOPs cannot be validated, the receiver can still trust the authenticity of the validated GOPs and the validated GOPs' encoded image frames. That is in contrast with the case when the video sequence has to be validated in its entirety, wherein the receiver cannot trust the authenticity of any of the encoded image frames of the video sequence if the entire video sequence cannot be validated.

Sometimes it is advantageous to provide information about where in the data structure each one of the small LC encoded image frames are located. This may for example, simplify for a receiver 130 to find and extract small LC encoded image frames from a received data structure. As will be described below when describing the method performed by the receiver 130, the receiver 130 may use the extracted small LC encoded image frames to generate, i.e., reconstruct, their corresponding transmitted encoded image frames and the hashes thereof when verifying the received encoded image frames.

Therefore, some embodiments comprise a step S508, wherein the transmitter 110 determines, for each small LC encoded image frame 220LCb-1, 220LCb-2, the location of each small LC encoded image frame 220LCb-1, 220LCb-2 in the data structure 320. In step S508 the transmitter 110 may also determine a data size of each small LC encoded image frame 220LCb-1, 220LCb-2. Step S508 may be performed by a determining module 119 comprised in the transmitter 110 and being configured to determine the location of each small LC encoded image frame in the data structure. The determining module 119 may be comprised in the lossless compressing module 116. Alternatively, the determining module 119 may be comprised in the data structure generating module 118 of the transmitter 110. Embodiments may also comprise a step S510 wherein the transmitter 110 provides the data structure 320 with information specifying the location in the data structure 320 and optionally the data size of each small LC encoded image frame 220LCb-1, 220LCb-2. The providing of the location specifying information to the data structure 320 may be performed by the data structure generating module 118.

In order to enable validation of the video sequence, a digital signature is also needed. Therefore, in action S512, the transmitter 110 generates a digital signature 340 for the video sequence 200. This step may be performed by a digital signature generating module 124 configured to generate digital signatures and being comprised in the transmitter 110.

The transmitter 110 may have access to a private-public key pair, and may generate the digital signature by encrypting, with a private key of the private-public key pair, either:
  a hash of the data structure 320; or
  a hash of individual hashes of either: all the encoded image frames 220 of the video sequence 200, or all the obtained LC encoded image frames 220LC; 220LCa, 220LCb-1, 220LCb-2.

A private key of the private-public key pair may be stored in a secure storage only accessible by the transmitter 110. The secure storage may be a secure element (SE), e.g., a secure operating system (OS) in a tamper-resistant processor chip or secure component, or a trusted platform module (TPM), e.g. a secure cryptoprocessor or secure chip. A public key of the transmitter's private-public key pair may be stored in a data storage, e.g., the data storage 122, accessible by the receiver 130. Alternatively, the public key of the transmitter's private-public key pair may be transmitted with the video sequence 200 to the receiver 130. For example, the public key of the transmitter's private-public key pair may be comprised in or appended to the video sequence 200.

In action S514, the transmitter 110 provides the data structure 320 and the digital signature 340 to the video sequence 200. Thereby enabling a receiver 130 to validate the video sequence 200. A providing module 126 comprised in the transmitter 110 and being configured to provide data structures and digital signatures to video sequences may perform step S514.

The transmitter 110, e.g., by means of the providing module 126, may provide the data structure 320 and the digital signature 340 in a supplemental information unit (SIU) of the video sequence 200. The supplemental information unit is a unit or message configured to comprise supplemental information about or relating to the video sequence. The supplemental information unit may for example be a Supplemental Enhancement Information (SEI) message in the H.26x encoding format, or a Metadata Open Bitstream Unit (OBU) in the AV1 encoding format.

A receiver 130 may validate a received video sequence using a received digital signature and a received data structure as will be described in detail below.

Figure 4:
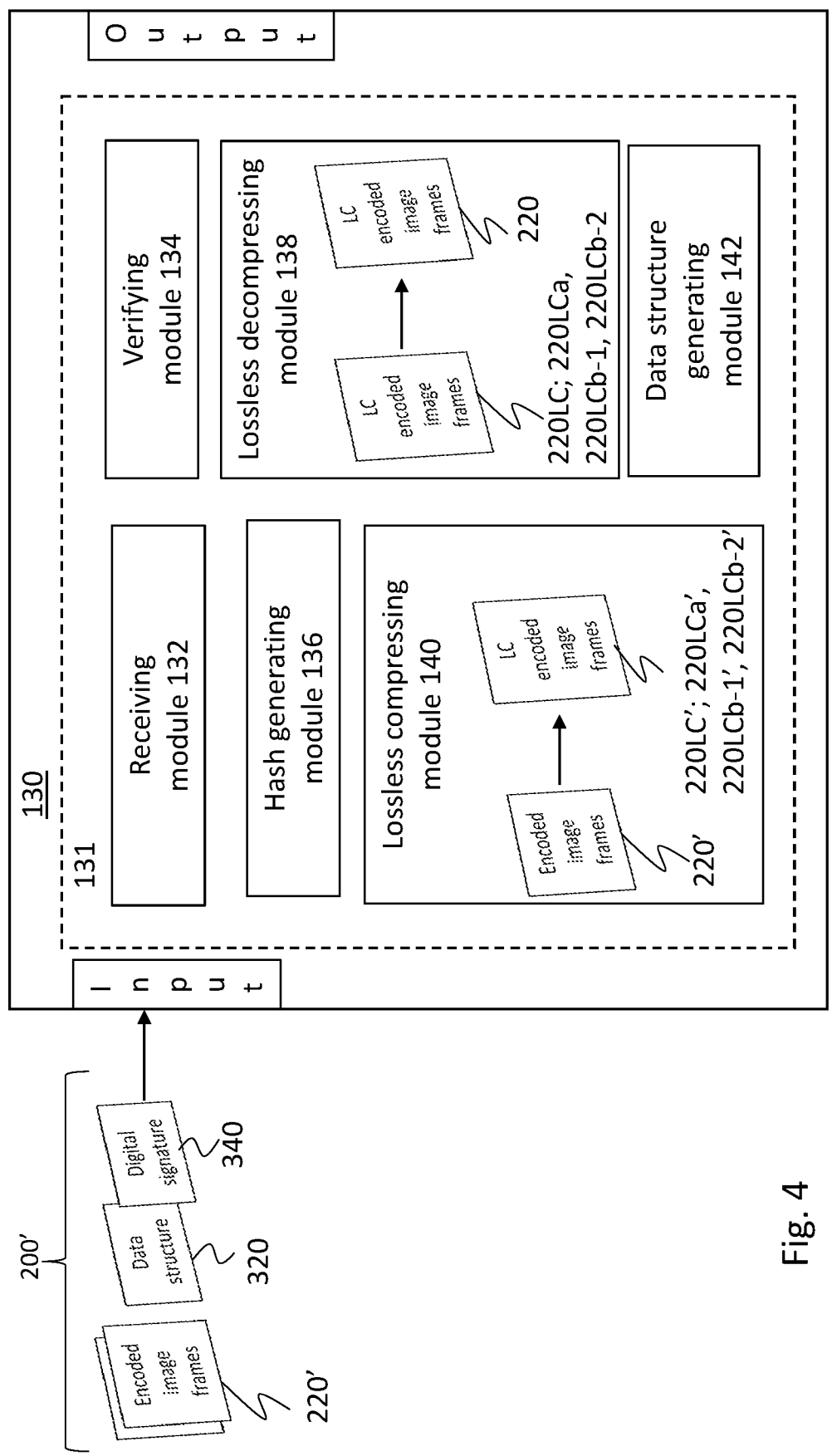
FIG. 4 schematically illustrates a receiver according to embodiments.

A method performed by the receiver 130 for validating a video sequence 200' provided with a data structure 320 and a digital signature 340, will now be described with reference to the flowchart of FIG. 6 and to the embodiment of the receiver 130 schematically illustrated in FIG. 4. The video sequence 200' comprises encoded image frames 220'.

In step S602 the receiver 130 receives, from the transmitter 110, the video sequence 200' comprising encoded image frames 220' and being provided with the data structure 320 and the digital signature 340. Preferably, the video sequence 200' received by the receiver 130 and the video sequence 200 transmitted by the transmitter 110 are identical. However, a transmitted video sequence may be manipulated after its transmittal and before its reception, therefore the reference numeral 200 is used for the transmitted video sequence and the reference numeral 200' is used for the received video sequence. Step S602 may be performed by a receiving module 132 comprised in the receiver 130 and being configured to receive video sequences.

The received data structure 320 comprises one or more small LC encoded image frames 220LCb-1, 220LCb-2, wherein each small LC encoded image frame 220LCb-1, 220LCb-2 has a data size that is smaller than a predefined number of bytes and is an LC version of a respective transmitted encoded image frame 220 comprised in a video sequence 200 transmitted from the transmitter 110. The received data structure 320 also comprises individual hashes of either all transmitted encoded image frames 220 lacking a respective small LC encoded image frame 220LCb-1, 220LCb-2, or all other LC encoded image frames 220LCa being different from the one or more small LC encoded image frames 220LCb-1, 220LCb-2. Each one of the all other LC encoded image frames 220LCa is an LC version of a respective transmitted encoded image frame 220 comprised in the transmitted video sequence 200.

As previously mentioned, when describing the method performed by the transmitter 110, the predefined number of bytes may be set in dependence on the hash function used. As the transmitter 110 and the receiver 130 use the same hash function it is understood that the predefined number of bytes set at the transmitter 110 is the same as the predefined number of bytes used at the receiver 130. The predefined number of bytes may be preset in the receiver 130 or information about the predefined number of bytes used by the transmitter 110 may be transmitted, e.g., together with the video sequence, from the transmitter 110 to the receiver 130. In step S604 the receiver 130 verifies the received digital signature 340 using the received data structure 320. Step S604 may be performed by a verifying module 134 comprised in the receiver 130 and being configured to verify digital signatures.

In some embodiments the receiver 130 has access to a public key of a private-public key pair of the transmitter 110. In such embodiments, the receiver 130 verifies the received digital signature 340 by decrypting the received digital signature 340 using the public key and by verifying the received digital signature 340 when a hash of the received data structure 320 matches the received digital signature 340 as decrypted. Alternatively, the received digital signature 340 is verified when a hash of all individual hashes for all LC encoded image frames as given by the received data structure 340 matches the received digital signature 340 as decrypted. In yet an alternative, the received digital signature 340 is verified when a hash of all individual hashes for all encoded image frames as given by the received data structure 340 matches the received digital signature 340 as decrypted.

In step S606 the receiver 130 verifies the received encoded image frames 220' as being equal to the transmitted encoded image frames 220 using the received data structure 320. Step S606 may be performed by the verifying module 134 comprised in the receiver 130 and being configured to verify encoded image frames. The received video sequence 200' is validated as being equal to the transmitted video sequence 200 when the received digital signature 340 and the received encoded image frames 220' are verified.

Verification of the Received Encoded Image Frames 220' (Step S606)

The verification of the received encoded image frames 220' (step S606) will now be described in more detail with reference to some different embodiments. Before going into the details, it could be said that in general the verification is made by comparing hashes of the received encoded image frames with hashes of the encoded image frame as given by the received data structure (as in some first embodiments below), by comparing hashes of LC received encoded image frames with hashes of the LC encoded image frame as given by the received data structure (as in some second embodiments below) or by comparing the received data structure with a generated data structure (as in some third embodiments below).

Further, it should be recalled that the data structure 320 transmitted by the transmitter 110 and received by the receiver 130 comprises, in addition to the one or more small LC encoded image frames 220LCb-1, 220LCb-2, the individual hashes of either: all transmitted encoded image frames 220 lacking a respective small LC encoded image frames 220LCb-1, 220LCb-2 (as in some first embodiments below), or all other LC encoded image frames 220LCa being different from the one or more small LC encoded image frames 220LCb-1, 220LCb-2 (as in some second and third embodiments below).

Some First Embodiments

In some first embodiments, the received data structure 320 comprises, in addition to the small LC encoded image frames 220LCb-1, 220LCb-2, individual hashes of all transmitted encoded image frames 220 lacking a respective small LC encoded image frames 220LCb-1, 220LCb-2. In such first embodiments, the receiver 130 has to generate hashes of the received encoded image frames and has to determine the individual hash(-es) of the respective encoded image frame of the one or more small LC encoded image frames'

220LCb-1, 220LCb-2 comprised in the received data structure 320. Therefore, the verifying (step S606) of the received encoded image frames 220' as being equal to the transmitted encoded image frames 220 using the received data structure 320 comprises four sub-steps S606.1.1-S606.1.4, which are illustrated in FIG. 7A.

In sub-step S606.1.1 the receiver 130 generates individual hashes of each received encoded image frame 220' comprised in the received video sequence 200'. A hash generating module 136 comprised in the receiver 130 may perform the generation of the individual hashes.

In sub-step S606.1.2 the receiver 130 performs lossless decompression of each of the one or more small LC encoded image frames 220LCb-1, 220LCb-2 comprised in the received data structure 320 to obtain a respective encoded image frame. By performing lossless decompression on an LC encoded image frame 220LC, the (original) encoded image frame 220 on which the transmitter 110 performed the lossless compression to obtain the LC encoded image frame will be obtained. Some examples of lossless decompression algorithms are Huffman decoding, arithmetic decoding, codebook-based decoding, and run-length decoding. A lossless decompressing module 138 comprised in the receiver 130 may perform the lossless decompression.

In sub-step S606.1.3 the receiver 130 generates individual hashes of each obtained respective encoded image frame 220. This may be performed by the hash generating module 136.

In sub-step S606.1.4 the receiver 130 verifies the received encoded image frames 220' as being equal to the transmitted encoded image frames 220 when the generated individual hashes of each received encoded image frame 220' comprised in the received video sequence 200' match the generated individual hashes of each obtained respective encoded image frame 220. This may be performed by the verifying module 134.

Some Second Embodiments

In some second embodiments, the received data structure 320 comprises, in addition to the small LC encoded image frames 220LCb-1, 220LCb-2, individual hashes of all other LC encoded image frames 220LCa being different from the one or more small LC encoded image frames 220LCb-1, 220LCb-2. In such second embodiments, the verifying (step S606) of the received encoded image frames 220' as being equal to the transmitted encoded image frames 220 using the received data structure 320 comprises four sub-steps S606.2.1-S606.2.4, which are illustrated in FIG. 7B.

In sub-step S606.2.1 the receiver 130 performs lossless compression of each received encoded image frame 220' comprised in the received video sequence 200' to obtain respective LC received encoded image frames 220LC'; 220LCa', 220LCb-1', 220LCb-2'. Some examples of lossless compression algorithms are Huffman coding, arithmetic encoding, codebook-based encoding, and run-length encoding. A lossless compressing module 140 comprised in the receiver 130 may perform the lossless compression.

In sub-step S606.2.2 the receiver 130 generates individual hashes of all obtained respective LC received encoded image frames 220LC'; 220LCa', 220LCb-1', 220LCb-2'. This may be performed by the hash generating module 136.

In sub-step S606.2.3 the receiver 130 generates individual hashes for all the LC encoded image frames 220LC; 220LCa, 220LCb-1, 220LCb-2 as given by the received data structure 320. As the individual hashes of the all other LC encoded image frames 220LCa being different from the one or more small LC encoded image frames 220LCb-1, 220LCb-2 are comprised in the received data structure 320, the receiver 130 can retrieve them directly from the data structure 320. In addition, the receiver 130 retrieves the one or more small LC encoded image frames 220LCb-1, 220LCb-2 comprised in the received data structure 320 and then individually hashes them. The receiver 130 will generate the individual hashes differently depending on whether or not the one or more small LC encoded image frame 220LCb-1, 220LCb-2 is of the first type or the second type. Sub-step S606.2.3 may be performed by the hash generating module. A detailed description of the generation of the individual hashes will be given after the description of sub-step S606.2.4.

In sub-step S606.2.4 the receiver 130 verifies the received encoded image frames 220' as being equal to the transmitted encoded image frames 220 when the generated individual hashes for all the LC encoded image frames 220LC; 220LCa, 220LCb-1, 220LCb-2 as given by the received data structure 320 match the generated individual hashes of all obtained respective LC received encoded image frames 220LC'; 220LCa', 220LCb-1', 220LCb-2'. This may be performed by the verifying module 134.

Generation of Individual Hashes for all the LC Encoded Image Frames (Sub-Step S606.2.3)

How the receiver 130 generates individual hashes for all the LC encoded image frames 220LC; 220LCa, 220LCb-1, 220LCb-2 as given by the received data structure 320 (sub-step S606.2.3 above) will now be described in more detail with reference to two scenarios.

In a first scenario, one or more small LC encoded image frame 220LCb-1 is of the first type and is equal to the encoded image frame 220 having a data size that is smaller than the predefined number of bytes or equal to the LC encoded image frame 220LC of the encoded image frame 220 when the LC encoded image frame 220LC is smaller than the encoded image frame 220 and has a data size that is smaller than the predefined number of bytes. The encoded image frame 220 is the original encoded image frame transmitted by the transmitter 110. The small LC encoded image frame 220LCb-1 is equal to the encoded image frame 220 when the LC encoded image frame obtained, by the transmitter's lossless compressing module 116 when performing lossless compression on the original encoded image frame, had a size that was larger than the original encoded image frame and the lossless compressing module 116 outputs the original encoded image frame as the obtained LC encode image frame. Thus, in the first scenario, the one or more of the small LC encoded image frames 220LCb-1, 220LCb-2 is a small LC encoded image frame 220LCb-1 of a first type and is equal to its respective transmitted encoded image frame 220 or equal to the LC encoded image frame 220LC of the encoded image frame 220. The received data structure 320 further comprises information specifying a location, in the data structure 320, and optionally a size, of the small LC encoded image frame 220LCb-1 of the first type. In this first scenario, the generating of individual hashes for all the LC encoded image frames 220LCa, 220LCb-1, 220LCb-2 as given by the received data structure 320 comprises:

extracting, from the received data structure 320, the small LC encoded image frame 220LCb-1 of the first type and the individual hashes of the all other LC encoded image frames 220LCa;

generating individual hashes of the extracted small LC encoded image frames 220LCb-1 of the first type by individually hashing them; and generating the individual hashes for all the LC encoded image frames 220LCa, 220LCb-1, 220LCb-2 as a combination of the generated individual hashes of the extracted first type of small LC encoded image frames 220LCb-1 and of the extracted individual hashes of the all other encoded image frames 220LCa.

In a second scenario, one or more small LC encoded image frame 220LCb-2 is of the second type. This may be the case when the transmitter 110 determines that the respective (original) encoded image frame 220 of the small LC encoded image frame 220LCb-2 of the second type is equal to a part of a stored encoded image frame 220e. For example, when the transmitter 110, e.g., by means of the lossless compressing module 116, determines that the respective encoded image frame 220 is a skip frame that is identical to a stored encoded image frame 220e, the small LC encoded image frame 220LCb-2 of the second type may be generated to comprise only an identifier of the stored encoded image frame 220e without any other image data. As another example, the transmitter 110, e.g., by means of the lossless compressing module 116, may determines that the respective encoded image frame 220 is partly identical to a stored encoded image frame 220e. Then, the small LC encoded image frame 220LCb-2 of the second type may be generated to comprise an identifier of the stored encoded image frame 220e and a difference relative the stored encoded image frame 220e. Thus, one or more of the small LC encoded image frames 220LCb-1, 220LCb-2 is a small LC encoded image frame 220LCb-2 of a second type and comprises an identifier of a stored predefined encoded image frame 220e and a possible difference between the respective transmitted encoded image frame 220 and the stored predefined encoded image frame 220e. The received data structure 320 further comprises information specifying a location, in the data structure 320, and optionally the data size, of the small LC encoded image frame 220LCb-2 of the second type. In this second scenario, the generating of individual hashes for all the LC encoded image frames 220LCa, 220LCb-1, 220LCb-2 as given by the received data structure 320 comprises:

extracting, from the received data structure 320:
the identifier of the stored predefined encoded image frame 220e and the possible difference between the respective transmitted encoded image frame 220 and the stored encoded image frame 220e, for each small LC encoded image frame 220LCb-2 of the second type; and
the individual hashes of the all other LC encoded image frames 220LCa;
retrieving, from a data storage 122 accessible to the transmitter 110 and the receiver 130 of the video sequence 200, the stored encoded image frame 220e using the extracted identifier;
reconstructing each respective transmitted encoded image frame 220 for each LC encoded image frame 220LCb-2 of the second type by combining the retrieved stored predefined encoded image frame 220e and the possible difference;
performing lossless compression of the reconstructed transmitted encoded image frames;
generating individual hashes of the LC reconstructed transmitted encoded image frames by individually hashing them; and
generating the further data structure 330 to comprise the generated individual hashes of the LC reconstructed transmitted encoded image frames 220 and the extracted individual hashes of the all other LC encoded image frames 220LCa.

Some Third Embodiments

In some third embodiments, the received data structure 320 comprises individual hashes of all other LC encoded image frames 220LCa being different from the one or more small LC encoded image frames 220LCb-1, 220LCb-2. In order to verify the received encoded image frames 220' the receiver 130 generates a data structure comprising one or more small LC encoded image frames and individual hashes of all LC encoded image frames being different from the one or more small encoded image frames, and compares it with the received data structure. Therefore, in such third embodiments, the verifying (step S606) of the received encoded image frames 220' as being equal to the transmitted encoded image frames 220 using the received data structure 320 comprises three sub-steps S606.3.1-S606.3.3, which are illustrated in FIG. 7C.

In sub-step S606.3.1 the receiver 130 performs lossless compression of each received encoded image frame 220' comprised in the received video sequence 200' to obtain respective LC received encoded image frames 220LCa', 220LCb-1', 220LCb-2'. Some examples of lossless compression algorithms are Huffman coding, arithmetic encoding, codebook-based encoding, and run-length encoding. The lossless compressing module (not shown) comprised in the receiver 130 may perform the lossless compression.

In sub-step S606.3.2 the receiver 130 generates a data structure 320' comprising:
one or more small LC received encoded image frames 220LCb-1', 220LCb-2' identified to each have a data size that is smaller than a predefined number of bytes, and
individual hashes of all other LC received encoded image frames 220LCa' being different from the one or more small LC encoded image frames 220LCb-1', 220LCb-2'. The individual hashes are obtained by individually hashing each one of the all other LC received encoded image frame 220LCa'.

This may be performed by a data structure generating module 142 comprised in the receiver 130.

In sub-step S606.3.3 the receiver 130 verifies the received encoded image frames 220' as being equal to the transmitted encoded image frames 220 when the generated data structure 320' matches the received data structure 320. This may be performed by the verifying module 134.

Embodiments also relate to a non-transitory computer-readable medium having stored thereon computer code instructions adapted to carry out embodiments of the methods described herein when executed by a device having processing capability.

As described above, the transmitter 110 may be configured to implement a method for enabling validation of a video sequence by providing the video sequence with the data structure and the digital signature, and the receiver 130 may be configured to implement a method for validating the video sequence by providing the video sequence with the data structure and the digital signature. For this purpose, the transmitter 110 and the receiver 130, respectively, may include processing circuitry 111, 131, respectively, which is configured to implement the various method steps described herein.

In a hardware implementation, the processing circuitry 111, 131 may be dedicated and specifically designed to implement one or more of the method steps. The circuitry may be in the form of one or more integrated circuits, such as one or more application specific integrated circuits or one or more field-programmable gate arrays.

By way of example, the transmitter 110 may hence comprise processing circuitry 111 which, when in use:
  performs lossless compression of each encoded image frame of the video sequence to obtain a respective LC encoded image frame;
  among the obtained LC encoded image frames, identifies one or more small LC encoded image frames each having a data size that is smaller than a predefined number of bytes;
  generates a data structure comprising the identified one or more small LC encoded image frames, and individual hashes of either: all encoded image frames lacking a respective small LC encoded image frame; or all other obtained LC encoded image frames being different from the one or more small LC encoded image frames, wherein the individual hashes are obtained by individually hashing each one of the all encoded image frames lacking a respective small LC encoded image frame, or by individually hashing each one of the all other obtained LC encoded image frame, respectively;
  generates a digital signature for the video sequence; and
  provides the data structure and the digital signature to the video sequence.
Thereby enabling a receiver to validate the video sequence.

By way of example, the receiver 130 may comprise processing circuitry 131 which, when in use:
  receives the video sequence comprising encoded image frames and being provided with the data structure and the digital signature. The received data structure comprises: one or more small LC encoded image frames, wherein each small LC encoded image frame has a data size that is smaller than a predefined number of bytes and is an LC version of a respective transmitted encoded image frame comprised in a video sequence transmitted from the transmitter; and individual hashes of either: all transmitted encoded image frames lacking a respective small LC encoded image frame; or all other LC encoded image frames being different from the one or more small LC encoded image frames. Each one of the all other LC encoded image frames is an LC version of a respective transmitted encoded image frame comprised in the transmitted video sequence;
  verifies the received digital signature using the received data structure; and verifying the received encoded image frames as being equal to the transmitted encoded image frames using the received data structure. Whereby the received video sequence is validated as being equal to the transmitted video sequence when the received digital signature and the received encoded image frames are verified.

In a software implementation, the circuitry may instead be in the form of a processor, such as a microprocessor, which in association with computer code instructions stored on a (non-transitory) computer-readable medium, such as a non-volatile memory, causes the transmitter 110 and the receiver 130, respectively, to carry out the respective method disclosed herein. Examples of non-volatile memory include read-only memory, flash memory, ferroelectric RAM, magnetic computer storage devices, optical discs, and the like. In a software case, each of the method steps described above may thus correspond to a portion of computer code instructions stored on the computer-readable medium, that, when executed by the processor, causes the transmitter 110 and the receiver 130, respectively, to carry out the respective method disclosed herein.

It is to be understood that it is also possible to have a combination of a hardware and a software implementation, meaning that some method steps are implemented in hardware and others in software.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method performed by a transmitter for enabling validation of a video sequence by providing the video sequence with a data structure and a digital signature, wherein the video sequence comprises encoded image frames, the method comprising:
  performing lossless compression of each encoded image frame of the video sequence to obtain a respective losslessly compressed (LC) encoded image frame;
  identifying one or more LC encoded image frames, each having a data size that is smaller than a predefined number of bytes, as small LC encoded image frames;
  generating a data structure comprising:
    the one or more small LC encoded image frames; and
    individual hashes of either:
      all encoded image frames lacking a respective small LC encoded image frame; or
      all other obtained LC encoded image frames being different from the one or more small LC encoded image frames,
    wherein the individual hashes are obtained by individually hashing each one of the all encoded image frames lacking a respective small LC encoded image frame, or by individually hashing each one of the all other obtained LC encoded image frame, respectively;
  generating a digital signature for the video sequence; and
  providing the data structure and the digital signature to the video sequence, thereby enabling a receiver to validate the video sequence.

2. The method according to claim 1, wherein at least one of the one or more small LC encoded image frames is a small LC encoded image frame of a first type and is equal to its respective encoded image frame or equal to the LC encoded image frame of the encoded image frame.

3. The method according to claim 1, wherein at least one of the one or more small LC encoded image frames is a small LC encoded image frame of a second type and comprises an identifier of a stored predefined encoded image frame and a possible difference between the small LC encoded image frame of the second type and the stored predefined encoded image frame.

4. The method according to claim 1, further comprising, for each small LC encoded image frame,
  determining its location in the data structure; and
  providing the data structure with information specifying the location in the data structure and optionally the data size of each small LC encoded image frame.

5. The method according to claim 1, wherein the data structure is a document comprising a reduced hash list, wherein the reduced hash list consists only of:
  the one or more small LC encoded image frames; and the individual hashes of either:
all encoded image frames lacking a respective small LC encoded image frames; or
all other obtained LC encoded image frames being different from the one or more small LC encoded image frames.

6. The method according to claim 1, wherein the transmitter has access to a private-public key pair, and wherein generating of the digital signature further comprises:
generating the digital signature by encrypting, with a private key of the private-public key pair, either:
a hash of the data structure; or
a hash of individual hashes of either: all the encoded image frames of the video sequence, or all the obtained LC encoded image frames.

7. A method performed by a receiver for validating a video sequence provided with a data structure and a digital signature, wherein the video sequence comprises encoded image frames, the method comprising:
receiving, from a transmitter, the video sequence comprising encoded image frames and being provided with the data structure and the digital signature,
wherein the received data structure comprises:
one or more small losslessly compressed (LC) encoded image frames, each small LC encoded image frame has a data size that is smaller than a predefined number of bytes and is an LC version of a respective transmitted encoded image frame comprised in a video sequence transmitted from the transmitter; and
individual hashes of either:
all transmitted encoded image frames lacking a respective small LC encoded image frame; or
all other LC encoded image frames being different from the one or more small LC encoded image frames, wherein each one of the all other LC encoded image frames is an LC version of a respective transmitted encoded image frame comprised in the transmitted video sequence;
verifying the received digital signature using the received data structure; and
verifying the received encoded image frames as being equal to the transmitted encoded image frames using the received data structure; whereby the received video sequence is validated as being equal to the transmitted video sequence when the received digital signature and the received encoded image frames are verified.

8. The method according to claim 7, wherein, when the received data structure comprises individual hashes of all transmitted encoded image frames lacking a respective small LC encoded image frame, the verifying of the received encoded image frames as being equal to the transmitted encoded image frames using the received data structure comprises:
generating individual hashes of each received encoded image frame comprised in the received video sequence;
performing lossless decompression of each of the one or more small LC encoded image frames comprised in the received data structure to obtain a respective encoded image frame;
generating individual hashes of each obtained respective encoded image frame,
verifying the received encoded image frames as being equal to the transmitted encoded image frames when the generated individual hashes of each received encoded image frame comprised in the received video sequence match the generated individual hashes of each obtained respective encoded image frame.

9. The method according to claim 7, wherein, when the received data structure comprises individual hashes of all other LC encoded image frames being different from the one or more small LC encoded image frames, the verifying of the received encoded image frames as being equal to the transmitted encoded image frames using the received data structure comprises:
performing lossless compression of each received encoded image frame comprised in the received video sequence to obtain respective LC received encoded image frames;
generating individual hashes of all obtained respective LC received encoded image frames;
generating individual hashes for all the LC encoded image frames as given by the received data structure; and
verifying the received encoded image frames as being equal to the transmitted encoded image frames when the generated individual hashes for all the LC encoded image frames as given by the received data structure match the generated individual hashes of all obtained respective LC received encoded image frames.

10. The method according to claim 9, wherein one or more of the small LC encoded image frames is a small LC encoded image frame of a first type and is equal to its respective transmitted encoded image frame or equal to the LC encoded image frame of the encoded image frame, wherein the received data structure further comprises information specifying a location, in the data structure, and optionally a size, of the small LC encoded image frame of the first type, and wherein generating of individual hashes for all the LC encoded image frames as given by the received data structure comprises:
extracting, from the received data structure, the small LC encoded image frame of the first type and the individual hashes of the all other LC encoded image frames;
generating individual hashes of the extracted small LC encoded image frames of the first type by individually hashing them; and
generating the individual hashes for all the LC encoded image frames as a combination of the generated individual hashes of the extracted first type of small LC encoded image frames and of the extracted individual hashes of the all other encoded image frames.

11. The method according to claim 9, wherein one or more of the small LC encoded image frames is a small LC encoded image frame of a second type and comprises an identifier of a stored predefined encoded image frame and a possible difference between the respective transmitted encoded image frame and the stored predefined encoded image frame, wherein the received data structure further comprises information specifying a location, in the data structure, and optionally the data size, of the small LC encoded image frame of the second type, and wherein the generating of individual hashes for all the LC encoded image frames as given by the received data structure comprises:
extracting, from the received data structure:
the identifier of the stored encoded image frame and the possible difference between the respective transmitted encoded image frame and the stored encoded image frame, for each small LC encoded image frame of the second type; and
the individual hashes of the all other LC encoded image frames;

retrieving, from a data storage accessible to the transmitter and the receiver of the video sequence, the stored predefined encoded image frame using the extracted identifier;

reconstructing each respective transmitted encoded image frame for each LC encoded image frame of the second type by combining the retrieved stored predefined encoded image frame and the possible difference;

performing lossless compression of the reconstructed transmitted encoded image frames;

generating individual hashes of the LC reconstructed transmitted encoded image frames by individually hashing them;

generating the further data structure to comprise the generated individual hashes of the LC reconstructed transmitted encoded image frames and the extracted individual hashes of the all other LC encoded image frames.

12. The method according to claim 7, wherein, when the received data structure comprises individual hashes of all other LC encoded image frames being different from the one or more small LC encoded image frames, the verifying of the received encoded image frames as being equal to the transmitted encoded image frames using the received data structure comprises:

performing lossless compression of each received encoded image frame comprised in the received video sequence to obtain respective LC received encoded image frames;

generating a data structure comprising:
one or more small LC received encoded image frames identified to each have a data size that is smaller than a predefined number of bytes, and
individual hashes of all other LC received encoded image frames being different from the one or more small LC encoded image frames, wherein the individual hashes are obtained by individually hashing each one of the all other LC received encoded image frame; and verifying the received encoded image frames as being equal to the transmitted encoded image frames when the generated data structure matches the received data structure.

13. The method according to claim 7, wherein the receiver has access to a public key of a private-public key pair of the transmitter, and wherein the verifying of the received digital signature comprises decrypting the received digital signature using the public key and verifying the received digital signature when a hash of the received data structure matches the received digital signature as decrypted.

14. A transmitter for enabling validation of a video sequence by providing the video sequence with a data structure and a digital signature, wherein the transmitter comprises processing circuitry configured to cause the transmitter to:

perform lossless compression of each encoded image frame of the video sequence to obtain a respective losslessly compressed (LC) encoded image frame;

identify one or more LC encoded image frames, each having a data size that is smaller than a predefined number of bytes, as small LC encoded image frames;

generate a data structure comprising:
the one or more small LC encoded image frames; and
individual hashes of either:
all encoded image frames lacking a respective small LC encoded image frame; or
all other obtained LC encoded image frames being different from the one or more small LC encoded image frames,
wherein the individual hashes are obtained by individually hashing each one of the all encoded image frames lacking a respective small LC encoded image frame, or by individually hashing each one of the all other obtained LC encoded image frame, respectively;

generate a digital signature for the video sequence; and provide the data structure and the digital signature to the video sequence, thereby enabling a receiver to validate the video sequence.

15. A receiver for validating a video sequence provided with a data structure and a digital signature, wherein the receiver comprises processing circuitry configured to cause the receiver to:

receive the video sequence comprising encoded image frames and being provided with the data structure and the digital signature,
wherein the received data structure comprises:
one or more small losslessly compressed (LC) encoded image frames, each small LC encoded image frame has a data size that is smaller than a predefined number of bytes and is an LC version of a respective transmitted encoded image frame comprised in a video sequence transmitted from the transmitter; and
individual hashes of either:
all transmitted encoded image frames lacking a respective small LC encoded image frame; or
all other LC encoded image frames being different from the one or more small LC encoded image frames, wherein each one of the all other LC encoded image frames is an LC version of a respective transmitted encoded image frame comprised in the transmitted video sequence;

verifying the received digital signature using the received data structure; and verifying the received encoded image frames as being equal to the transmitted encoded image frames using the received data structure; whereby the received video sequence is validated as being equal to the transmitted video sequence when the received digital signature and the received encoded image frames are verified.

* * * * *